United States Patent
Yu (10) Patent No.: US 11,236,951 B2
(45) Date of Patent: Feb. 1, 2022

(54) HEAT EXCHANGER FIN SURFACE ENHANCEMENT

(71) Applicant: Johnson Controls Technology Company, Auburn Hills, MI (US)

(72) Inventor: Rong Yu, Moore, OK (US)

(73) Assignee: Johnson Controls Technology Company, Auburn Hills, MI (US)

( * ) Notice: Subject to any disclaimer, the term of this patent is extended or adjusted under 35 U.S.C. 154(b) by 196 days.

(21) Appl. No.: 16/250,902

(22) Filed: Jan. 17, 2019

(65) Prior Publication Data

US 2020/0182562 A1 Jun. 11, 2020

Related U.S. Application Data (60) Provisional application No. 62/776,269, filed on Dec. 6, 2018.

(51) Int. Cl.
*F28F 1/12* (2006.01)
*F25B 39/02* (2006.01)
*F28F 17/00* (2006.01)

(52) U.S. Cl.
CPC .............. *F28F 1/128* (2013.01); *F25B 39/02* (2013.01); *F28F 17/005* (2013.01)

(58) Field of Classification Search
CPC .......... F28F 1/128; F28F 17/005; F25B 39/02
See application file for complete search history.

(56) References Cited

U.S. PATENT DOCUMENTS

| | | | |
|---|---|---|---|
| 5,228,197 A * | 7/1993 | Cox | F24F 1/0007 29/469 |
| 5,404,938 A | 4/1995 | Dinh | |
| 5,927,392 A * | 7/1999 | Youn | F28F 1/325 165/151 |
| 6,439,300 B1 | 8/2002 | Falta et al. | |
| 7,775,267 B2 | 8/2010 | Higashiyama et al. | |
| 8,627,881 B2 * | 1/2014 | Alahyari | F28F 1/128 165/152 |
| 9,234,706 B2 | 1/2016 | Hamada et al. | |
| 9,803,935 B2 * | 10/2017 | Kamada | F25D 21/12 |
| 9,803,936 B2 * | 10/2017 | Mun | F28F 1/022 |
| 2007/0151716 A1 * | 7/2007 | Lee | F28F 17/005 165/151 |
| 2008/0190588 A1 * | 8/2008 | Heidenreich | F28D 1/047 165/151 |
| 2010/0071868 A1 | 3/2010 | Reifel et al. | |
| 2010/0089557 A1 * | 4/2010 | Kim | F28F 17/005 165/151 |
| 2010/0089562 A1 * | 4/2010 | Shibata | F28F 17/005 165/181 |
| 2010/0107675 A1 | 5/2010 | Lifson et al. | |
| 2010/0175864 A1 * | 7/2010 | Fujino | F28F 1/325 165/182 |
| 2011/0232884 A1 | 9/2011 | Jiang et al. | |
| 2012/0103587 A1 * | 5/2012 | Park | F24F 1/18 165/181 |
| 2013/0240186 A1 | 9/2013 | Taras et al. | |

(Continued)

*Primary Examiner* — Jon T. Schermerhorn, Jr.
(74) *Attorney, Agent, or Firm* — Fletcher Yoder, P.C.

(57) ABSTRACT

A heat exchanger includes a conduit configured to flow a refrigerant therethrough and a fin coupled to the conduit. The fin has a slot formed therethrough, in which the slot has a first portion and a second portion continuous with the first portion and disposed at an angle relative to the first portion.

24 Claims, 7 Drawing Sheets

(56) References Cited

U.S. PATENT DOCUMENTS

| | | | |
|---|---|---|---|
| 2014/0034271 A1* | 2/2014 | Lee | F28F 17/00 |
| | | | 165/96 |
| 2015/0000320 A1 | 1/2015 | Kamada et al. | |
| 2015/0068718 A1 | 3/2015 | Ota et al. | |
| 2015/0192372 A1* | 7/2015 | Mun | F28F 19/00 |
| | | | 165/174 |
| 2018/0100659 A1* | 4/2018 | Yoshimura | F28F 1/128 |
| 2019/0137193 A1* | 5/2019 | Yoshioka | F28F 1/02 |
| 2019/0390922 A1* | 12/2019 | Wang | B21D 53/022 |

\* cited by examiner

HEAT EXCHANGER FIN SURFACE ENHANCEMENT

CROSS REFERENCE TO RELATED APPLICATIONS

This application claims priority from and the benefit of U.S. Provisional Application Ser. No. 62/776,269, entitled "HEAT EXCHANGER FIN SURFACE ENHANCEMENT", filed Dec. 6, 2018, which is hereby incorporated by reference in its entirety for all purposes.

BACKGROUND

The present disclosure relates generally to heating, ventilation, and/or air conditioning (HVAC) systems, and specifically, relates to surface enhancements for a fin of a heat exchanger.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Environmental control systems are utilized in residential, commercial, and industrial environments to control environmental properties, such as temperature and humidity, for occupants of the respective environments. The environmental control system may control the environmental properties through control of an air flow delivered to and ventilated from the environment. For example, a heating, ventilation, and air conditioning (HVAC) system may use a heat exchanger to place the air flow in thermal communication with a refrigerant directed through the heat exchanger. The heat exchanger may include fins to facilitate heat transfer between the air flow and the refrigerant. In some embodiments, condensate or moisture from the air flow may collect on the heat exchanger, including on the fins of the heat exchanger. It is now recognized that condensate may not be adequately drained from a fin of a heat exchanger, or condensate may drain along an undesirable direction when the fin is positioned at an angle with respect to a vector of gravity.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heat exchanger includes a conduit configured to flow a refrigerant therethrough and a fin coupled to the conduit. The fin has a slot formed therethrough, in which the slot has a first portion and a second portion continuous with the first portion and disposed at an angle relative to the first portion.

In another embodiment, a heat exchanger includes a first heat exchanger slab having a plurality of first fins, in which each first fin of the plurality of first fins has a plurality of first slots formed therethrough. Additionally, each first slot of the plurality of first slots has a first portion and a second portion continuous with the first portion, in which the first portion and the second portion are disposed at a first angle relative to one another. The heat exchanger also includes a second heat exchanger slab having a plurality of second fins, in which each second fin of the plurality of second fins has a plurality of second slots formed therethrough. Further, each second slot of the plurality of second slots has a third portion and a fourth portion continuous with the third portion, in which the third portion and the fourth portion are disposed at a second angle relative to one another.

In another embodiment, a heat exchanger includes a conduit configured to flow a working fluid therethrough, a fin coupled to the conduit and including an array of punch-throughs. Each punch-through of the array of punch-throughs includes a slot formed through the fin, in which a first portion of the slot of each punch-through of the array of punch-throughs has a first trajectory and a second portion of the slot of each punch-through of the array of punch-throughs is continuous with the first portion and has a second trajectory that is different than the first trajectory.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to heating, ventilation, and/or air conditioning (HVAC) systems that use a heat exchanger for conditioning an air flow directed through the HVAC system. For example, a refrigerant may be directed through a conduit of the heat exchanger, and the air flow may be directed across the conduit to be placed in thermal communication with the refrigerant. In some embodiments, the heat exchanger includes a fin configured to facilitate heat transfer between the air flow and the refrigerant by increasing a surface area of the heat exchanger in contact with the air flow. In particular, the fin may be coupled to the conduit to enable heat to transfer between the refrigerant, the conduit, the fin, and ultimately the air flow. When the air flow is directed across the fin, heat may transfer between the air flow and the fin. In certain embodiments, condensate, such as water condensate, may accumulate upon a surface of the fin as a result of the heat transfer, such as cooling of the air flow. As an example, condensate may form onto the surface of the fin as a result of water within the air flow condensing as the air flow is cooled by contacting the fin. Further, when the air flow is directed across the fin, the accumulated condensate may be forced off the fin and/or to other areas of the HVAC system by the air flow, which may affect a performance of the HVAC system. The fin may include a surface enhancement to facilitate drainage of the condensate across a surface of the fin to avoid accumulation of the condensate on the fin. In particular, the surface enhancement may direct the condensate off the fin in a desirable direction, such as toward a drainage system, such as a drain pan, conduit, or other collection area. In this manner, condensate may be removed from the fin in a desirable manner, thereby limiting an amount of condensate undesirably forced off the fin by the air flow.

As used herein, a surface enhancement may include a formation, such as a slot, a punch, a puncture, a perforation, a bump, a bend, a material treatment, or any other suitable discontinuity or formation, which may be formed on a surface of a heat exchanger fin to promote movement of the condensate across the surface of the fin. In some embodiments, the surface enhancement may be considered a punch-through. As used herein, a punch-through refers to a formation on the surface created by punching or indenting the surface to form an opening or slot through the surface. The punch-through may also include a protrusion that extends from the surface over and above the slot. In this manner, each punch-through may be formed on the surface of the fin using a single punching or indentation process, without having to couple a separate part onto the fin or otherwise having a separate process to form the protrusion. In additional or alternative embodiments, the surface enhancement may be a separate part, such as a rib, coupled to the fin to direct the condensate across the surface of the fin and may not have the slot. Generally, the condensate may be directed along the surface enhancement via gravitational force. That is, the surface enhancement may enable the gravitational force to pull the condensate across the surface of the fin.

In accordance with certain embodiments of the present disclosure, it is presently recognized that a heat exchanger fin with surface enhancements that align at an angle relative to an edge or longitudinal axis of the fin or a heat exchanger slab having the fin may improve a performance of an HVAC system. Additionally, the surface enhancement may include a first portion and a second portion disposed at an angle relative to one another to facilitate directing condensate off the fin at different orientations of the heat exchanger. In a non-limiting embodiment, the first portion and the second portion may be angled crosswise to the longitudinal axis. In this manner, the first portion and/or the second portion may promote movement of the condensate across the fin when the fin is disposed at an angle relative to the vector of gravity. Accordingly, operation of the HVAC system may be enhanced. That is, the heat exchanger may be disposed in different configurations, in which the fin may be oriented at a different angle with respect to the vector of gravity in the different configurations of the heat exchanger. However, the surface enhancements may readily direct condensate off the fin in the different configurations of the heat exchanger, thereby improving operation of the HVAC system without manufacturing fins of different configurations. In this manner, a cost to manufacture heat exchangers may be limited or reduced. Additionally, the surface enhancements may disrupt an air flow directed across the fin and the heat exchanger. The disruption of air flow may increase an amount of heat transferred between the air flow and the refrigerant. Thus, the surface enhancement may improve an efficiency of the heat exchanger.

Figure 1:
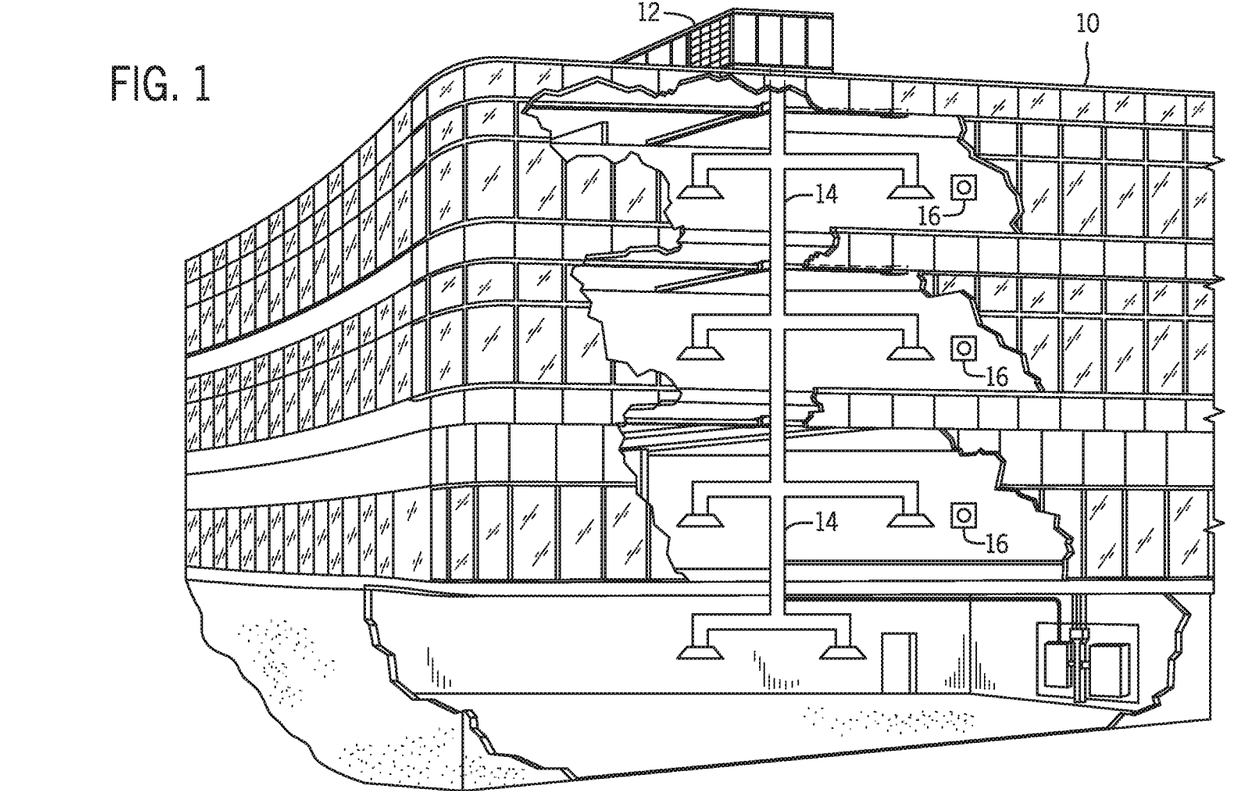
FIG. 1 is a schematic of an embodiment of an environmental control system for building environmental management that may employ one or more HVAC units, in accordance with an aspect of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
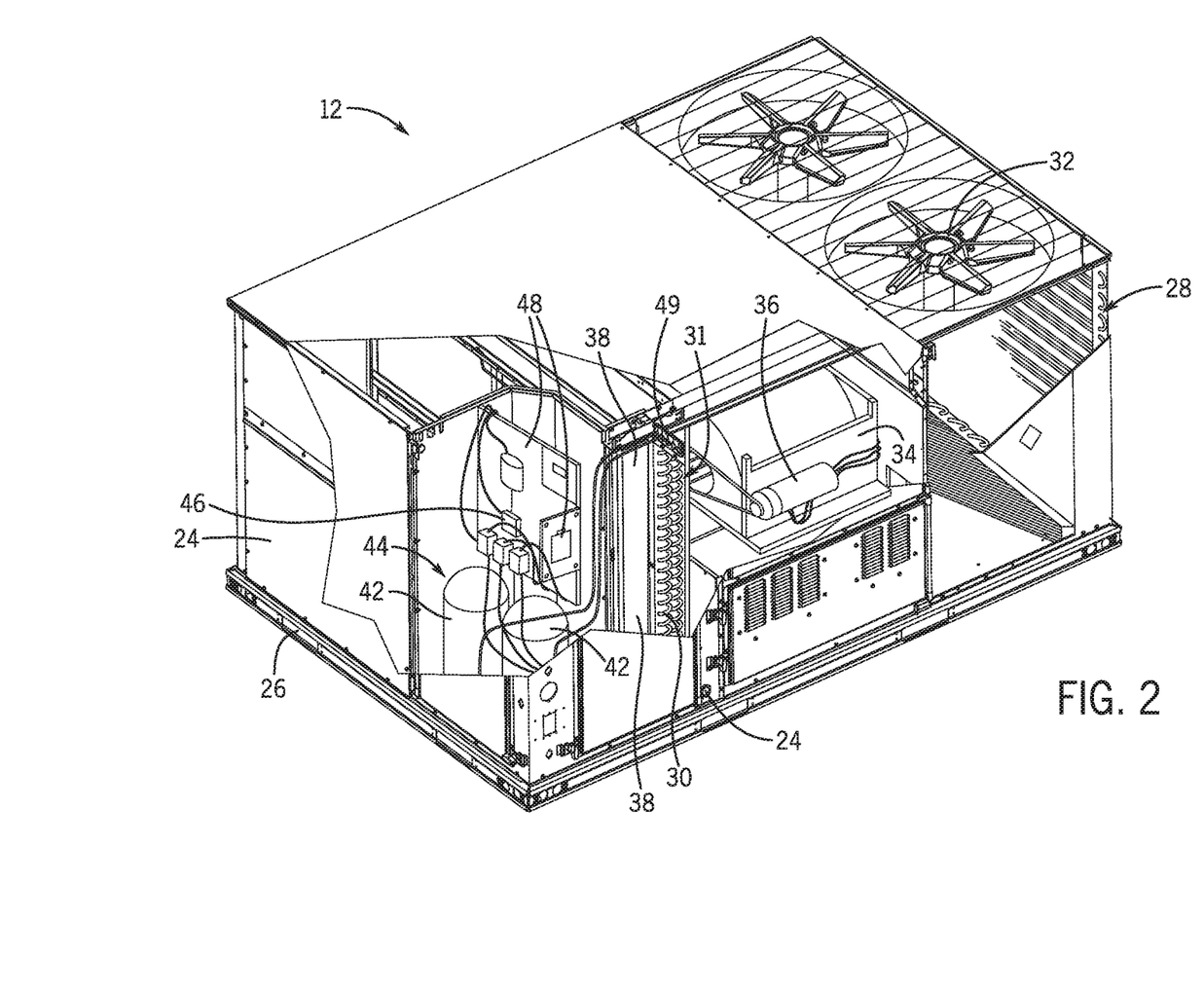
FIG. 2 is a perspective view of an embodiment of a packaged HVAC unit that may be used in the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
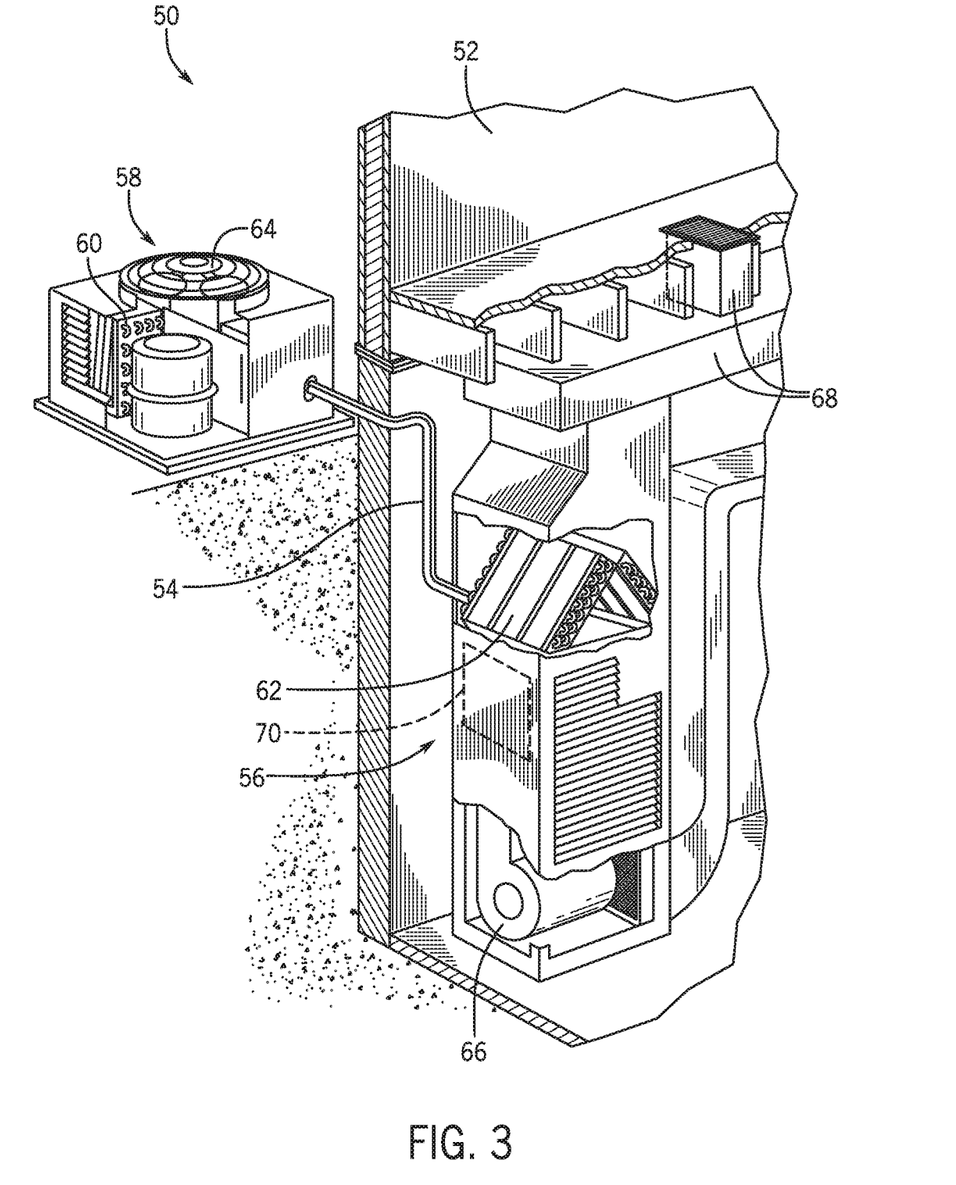
FIG. 3 is a schematic of an embodiment of a residential, split heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
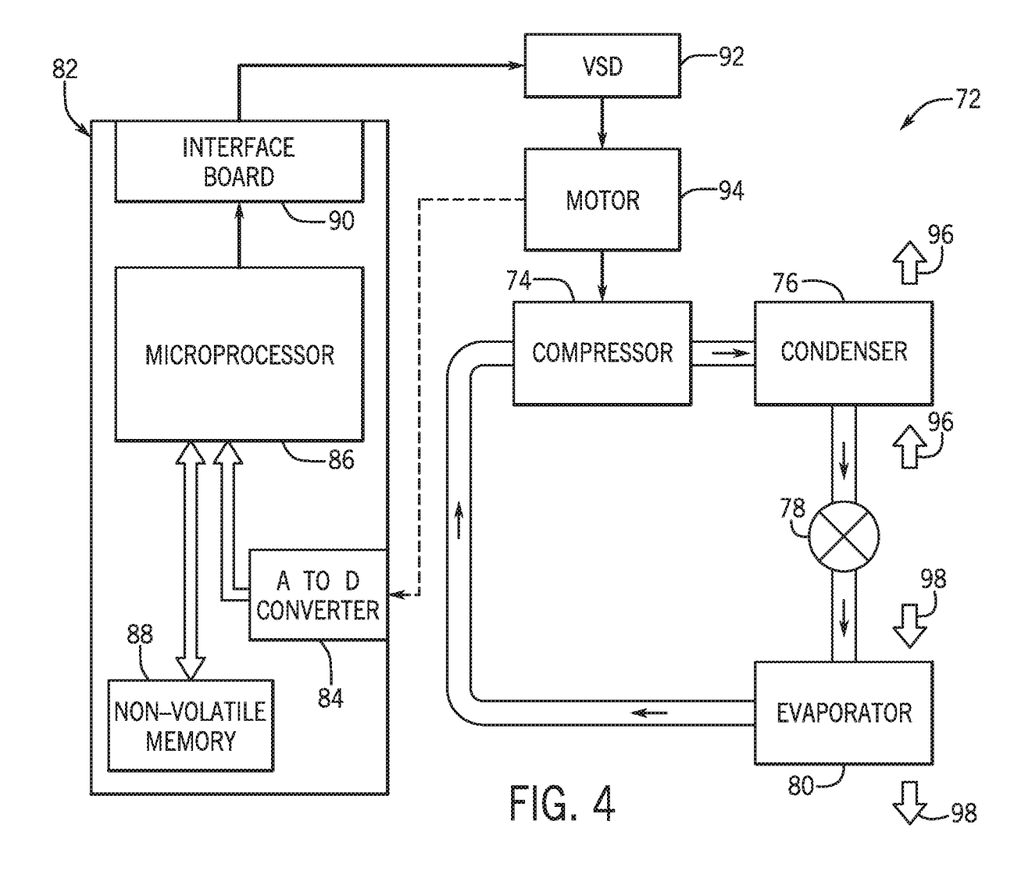
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

A heat exchanger of an HVAC system, such as the heat exchangers 28 and 30 of the HVAC unit 12 or the heat exchangers 60 and 62 of the residential heating and cooling system 50, may include fins to facilitate heat transfer between a refrigerant directed through the heat exchanger and an air flow directed across the heat exchanger. In general, the fins may increase a surface area of the heat exchanger that the air flow contacts during heat exchanger operation. Thus, the heat exchanger may increase an amount of heat transferred between the refrigerant and the air flow, thereby improving performance of the heat exchanger. In certain embodiments, during operation of the HVAC system and/or the heat exchanger, condensate may form on the fin. For example, as heat is removed from the air flow, condensate of the air flow may form and accumulate upon the fin. The fin may include surface enhancements, such as a punch-through having a protrusion and a slot, configured to direct the condensate off the fin to controllably remove the condensate from the fin and from the path along which the air flow travels. In other words, the surface enhancements may direct the condensate across and off the fin, such that the air flow does not readily force the condensate off the fins and/or toward another part of the HVAC system. For example, the surface enhancements may promote use of gravitational force to direct the condensate toward a drainage system of the HVAC system designed to remove the condensate from the HVAC system without affecting the performance of the HVAC system.

The heat exchanger may be positioned in the HVAC system in different configurations, in which the fin may be oriented at different angle with respect to the vector of gravity in the different configurations. To this end, the surface enhancement may include different portions, in which each portion may be angled crosswise with respect to a longitudinal axis of the fin or a heat exchanger slab having the fin and in which the portions of each surface enhancement are at an angle relative to one another. For example, in a first configuration of the heat exchanger, the fin may be oriented at a first angle with respect to the vector of gravity. A first portion of the surface enhancement may be generally aligned with the vector of gravity in the first configuration to promote movement of the condensate across the fin. In a second configuration of the heat exchanger, the fin may be oriented at a second angle with respect to the vector of gravity, where the second angle is different than the first angle. A second portion of the surface enhancement may be generally aligned with the vector of gravity in the second configuration to promote movement of the condensate across the fin. In this manner, the surface enhancement may effectively direct condensate off the fin in the different configurations of the heat exchanger.

Figure 5:
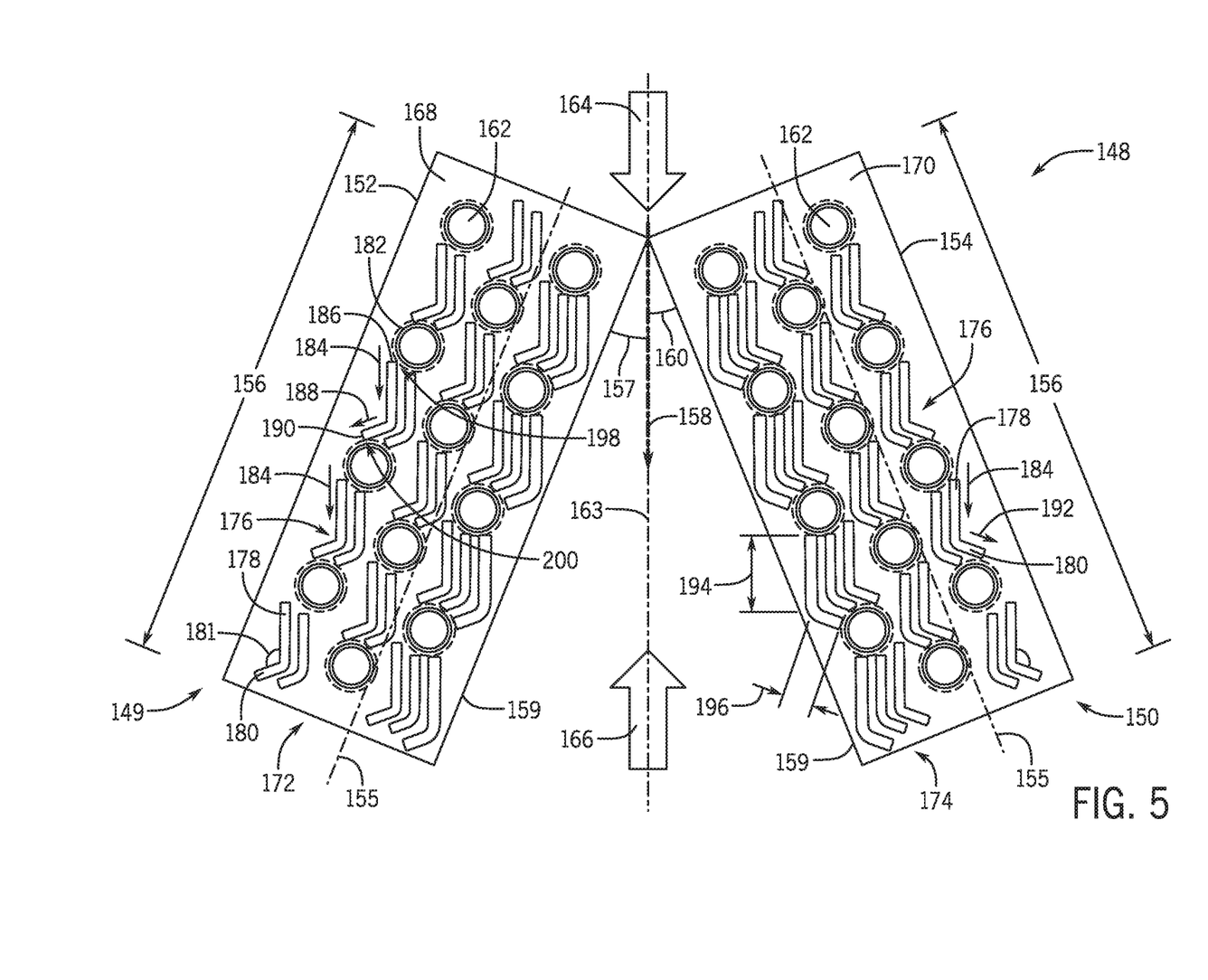
FIG. 5 is a cross-sectional axial view of an embodiment of a heat exchanger in a vertical orientation, illustrating heat exchanger fins having surface enhancements, in accordance with an aspect of the present disclosure.

FIG. 5 is a cross-sectional axial view of an embodiment of a heat exchanger 148 positioned in a first orientation that may be considered a vertical orientation of an operating condition. As an example, the heat exchanger 148 may be implemented in the vertical orientation in an indoor unit, such as the heat exchanger 62 of the indoor unit 56 of the residential heating and cooling system 50. The heat exchanger 148 includes a first heat exchanger slab 149 and a second heat exchanger slab 150, in which each heat exchanger slab includes a plurality of fins and conduits configured to place an air flow in thermal communication with a refrigerant or working fluid flowing through the conduits. For example, the fins of each heat exchanger slab 149, 150 may be aligned with one another, and conduits of each heat exchanger slab 149, 150 may be inserted through each fin. In this manner, refrigerant directed therethrough the conduits may transfer heat to the conduits and to the fins. It should be understood that the fins of each heat exchanger slab 149, 150 may have the same dimension or substantially different dimensions relative to one another. Additionally, in some embodiments, conduits of the respective heat exchanger slabs 149, 150 may be in fluid communication with one another to enable the refrigerant to be directed between each heat exchanger slab 149, 150. That is, the heat exchanger 148 may include conduits that couple the first heat exchanger slabs 149 with the second heat exchanger slab 150, and the refrigerant may flow through the conduits between the coupled heat exchanger slabs 149, 150. However, in additional or alternative embodiments, the first heat exchanger slab 149 may be fluidly separate from the second heat exchanger slab 150 and therefore, the first and second heat exchanger slabs 149, 150 may each include a respective, separate flow of refrigerant directed therethrough. In any case, the air flow may be directed across each heat exchanger slab 149, 150 to exchange heat with the refrigerant within the heat exchanger slabs 149, 150.

The illustrated embodiment of FIG. 5 depicts a first fin 152 of the first heat exchanger slab 149 and a second fin 154 of the second heat exchanger slab 150. In FIG. 5, each of the fins 152, 154 has a substantially rectangular perimeter, but it should be understood that in additional or alternative embodiments, each of the fins 152, 154 may have another suitable shape. As shown in FIG. 5, each heat exchanger slab 149, 150 may have a longitudinal axis 155 that extends generally along a length 156 of the respective heat exchanger slab 149, 150, which may be along a respective edge 159 of the fins 152, 154. The longitudinal axis 155 of the first heat exchanger slab 149 may be oriented at a first angle 157 relative to a vector of gravity 158, which is a generally vertical direction, to orient the first fin 152 at the first angle 157 relative to the vector of gravity 158. Moreover, the longitudinal axis 155 of the second heat exchanger slab 150 may be oriented at a second angle 160 with the vector of gravity 158 to orient the second fin 154 at the second angle 160 relative to the vector of gravity 158. In certain embodiments, the first angle 157 and the second angle 160 may be substantially the same angle and thus, the first fin 152 and the second fin 154 may be considered to be in mirrored orientations of one another across a central axis 163 extending between the first and second heat exchanger slabs 149, 150, such that the first and second heat exchanger slabs 149, 150 coordinate to form an A-shape configuration of the heat exchanger 148. In certain embodiments, the A-shape configuration includes an acute angle formed between the first and second heat exchanger slabs 149, 150.

The first fin 152 and the second fin 154 may each include a plurality of apertures 162 configured to permit conduits to be inserted therethrough. The embodiment illustrated in FIG. 5 depicts each aperture 162 as having substantially the same dimension, but it should be appreciated that each aperture 162 may include different dimensions suitable for conduits to be inserted therethrough and enable refrigerant to be directed through the conduits extending through the first and second fins 152, 154 within the conduits. In the illustrated configuration, as refrigerant is directed through the respective conduits that extend through the first and second fins 152, 154 via conduits disposed within the apertures 162, the air flow may be directed or forced across the first and second fins 152, 154 generally along the vector of gravity 158. That is, the air flow may be directed or forced through an airflow path in a first air flow direction 164 or a second air flow direction 166, in which the first and second air flow directions 164, 166 may each be substantially aligned with the vector of gravity 158. As the air flow is placed in contact with the first and second fins 152, 154, heat may be exchanged between the air flow and the refrigerant directed through the respective conduits that extend through the first and/or second fins 152, 154. As a result of the heat exchange, condensate from the air flow may accumulate upon the first and/or second fins 152, 154, such as on a first surface 168 of the first fin 152 and/or on a second surface 170 of the second fin 154.

It may generally be desirable to direct the condensate across the first and second surfaces 168, 170 and off the respective first and second fins 152, 154, such as toward a first fin end 172 of the first fin 152 and/or a second fin end 174 of the second fin 154. In one example, a drainage system may be positioned adjacent to the first and/or second fin ends 172, 174 to enable removal of the condensate from the heat exchanger 148 without affecting a performance of the heat exchanger 148. To this end, the first and/or second fins 152, 154 may each include an array of surface enhancements 176 formed on the first and/or the second surfaces 168, 170 that are configured to promote movement of the condensate toward the first and/or second fin ends 172, 174, respectively. Each surface enhancement 176 of the array of surface enhancements 176 may be a punch-through formed on and/or through the surfaces 168, 170 and/or may be a separate part coupled to the surfaces 168, 170. As illustrated in FIG. 5, each surface enhancement 176 may include a first portion or trajectory 178 and a second portion or trajectory 180 continuously extending from the first portion 178 at a surface enhancement angle 181. Each first portion 178 and second portion 180 may be arranged out of alignment or at an angle relative to the respective longitudinal axes 155 and/or edge 159. Furthermore, although each first portion 178 and the second portion 180 are depicted as substantially linear segments in FIG. 5, in additional or alternative embodiments, the first portion 178 and the second portion 180 may include other trajectories, such as curves, that generally extend in the respective directions that the first portion 178 and the second portion 180 extend in FIG. 5.

In general, the surface enhancements 176 may be discontinuities formed on the first and/or second surfaces 168, 170, in which the geometry of the surface enhancement 176 may induce and/or promote movement of the condensate across the respective first and second surfaces 168, 170 along the first and second portions 178, 180. For example, the force of gravity along the vector of gravity 158 may induce or promote movement of condensate that forms on the first surface 168, such as on an exterior edge 182 of one of the apertures 162 or conduits within the apertures 162, in a first condensate direction 184. Specifically, the surface enhancement 176 may promote movement of condensate beginning at a first surface enhancement end 186 of the surface enhancement 176 most adjacent to the aperture 162. Via the force of gravity, the condensate may travel along the first portion 178 to the second portion 180 of the surface enhancement 176. In some embodiments, the second portion 180 may be angled with respect to the first portion 178. For example, the surface enhancement angle 181 between the first portion 178 and the second portion 180 may be an obtuse angle, and a vector of the first portion 178 may extend generally along the vector of gravity 158. As such, the force of gravity may then further induce movement of the condensate in a second condensate direction 188 along the second portion 180. When the condensate approaches a second surface enhancement end 190 of the surface enhancement 176, the condensate may transfer to the exterior edge 182 of another aperture 162 that may guide the condensate to the first surface enhancement end 186 of another surface enhancement 176, along which the condensate may travel in a manner similar to that described above. Generally, condensate may travel along several surface enhancements 176 of the first surface 168 until the condensate reaches the first fin end 172 and is removed from the heat exchanger 148.

Similarly, the force of gravity may induce and/or promote movement of condensate on the second surface 170 of the heat exchanger 148 along the first portion 178 of each surface enhancement 176 in the first condensate direction 184 and along the second portion 180 in a third condensate direction 192. In this manner, the condensate may also travel along several surface enhancements 176 of the second surface 170 toward the second fin end 174 to be removed from the heat exchanger 148.

The illustrated embodiment of FIG. 5 depicts the first portion 178 as having a first surface enhancement length 194 and the second portion 180 as having a second surface enhancement length 196, in which the first surface enhancement length 194 is greater than the second surface enhancement length 196. However, it should be understood that, in certain embodiments, the first surface enhancement length 194 may be less than the second surface enhancement length 196, or the first surface enhancement length 194 may be substantially equal to the second surface enhancement length 196. In any case, each surface enhancement 176 may be formed to substantially connect adjacent apertures 162 within each heat exchanger slab 149, 150 to guide the condensate across the first and/or second surfaces 168, 170. For example, one of the surface enhancements 176 may be positioned on the first fin 152, such that a first gap 198 extends between the first surface enhancement end 186 and the exterior edge 182 of one of the apertures 162, and a second gap 200 extends between the second surface enhancement end 190 and the exterior edge 182 of another one of the apertures 162. The first gap 198 and the second gap 200 may each be sized to enable a bead or a drop of condensate to bridge the respective exterior edges 182 of different apertures 162 with the first surface enhancement end 186 or the second surface enhancement end 190. For example, the first gap 198 and/or the second gap 200 may each vary between 0.1 millimeters (mm) to 20 mm. As such, the surface enhancements 176 are arranged to guide condensate flow along the apertures 162 of the fins 152, 154. In this manner, the configuration and positioning of the surface enhancements 176 on the first and/or second surfaces 168, 170 relative to the apertures 162 may enable, facilitate, and/or promote movement of the condensate along the fins 152, 154 to improve drainage of the condensate.

Figure 6:
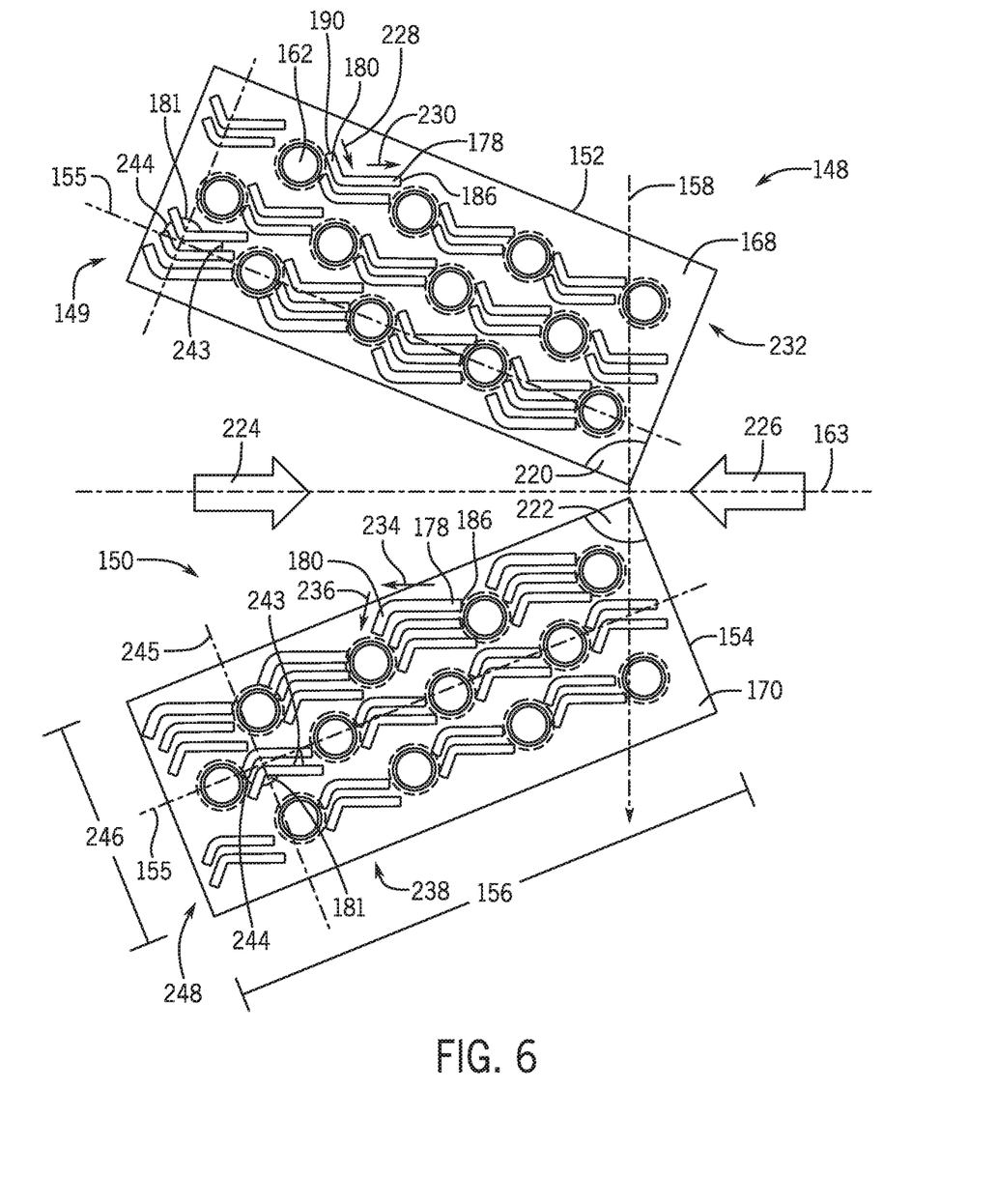
FIG. 6 is a cross-sectional axial view of an embodiment of a heat exchanger in a horizontal orientation, illustrating heat exchanger fins having surface enhancements, in accordance with an aspect of the present disclosure.

FIG. 6 is a schematic view of an embodiment of a heat exchanger 148 positioned in a second orientation that may be considered a horizontal orientation of the operating position. Generally, the heat exchanger 148 may be implemented in the horizontal orientation when air flow is directed substantially perpendicular with the vector of gravity 158, such as in a horizontal left or right air handler. As illustrated in FIG. 6, the horizontal orientation may be approximately perpendicular to the vertical orientation of the heat exchanger 148 shown in FIG. 5. Additionally, the first and second heat exchanger slabs 149, 150 may still be in mirrored orientations to one another about the central axis 163. In certain embodiments, the horizontal orientation of the heat exchanger 148 may be achieved by rotating the heat exchanger 148 from the vertical orientation shown in FIG.

5, such that the longitudinal axis 155 of the first heat exchanger slab 149 is oriented at a third angle 220 relative to the vector of gravity 158, and the longitudinal axis 155 of the second heat exchanger slab 150 is oriented at a fourth angle 222 relative to the vector of gravity 158. In the horizontal orientation of the heat exchanger 148, the air flow may be directed or forced across the heat exchanger 148 in a third air flow direction 224 or a fourth air flow direction 226, in which the third air flow direction 224 and the fourth air flow direction 226 may each be substantially perpendicular with the vector of gravity 158.

In the horizontal orientation, the force of gravity may induce formed condensate to travel along the first and second surfaces 168, 170. As an example, condensate may form on the first surface 168, such as on the exterior edge 182 of one of the apertures 162 or the conduit extending through one of the apertures 162. In some configurations, the formed condensate may travel from the exterior edge 182 toward a second portion 180 of a nearby surface enhancement 176. For example, when the heat exchanger 148 is in the horizontal configuration illustrated and when air flow is directed across the heat exchanger 148 in the third air flow direction 224, the air flow may promote movement of the condensate from the exterior edge 182 of one of the apertures 162 to the second portion 180 of one the surface enhancements 176. Thereafter, the condensate may travel in a fourth condensate direction 228 down the second portion 180. Movements of the condensate down the second portion 180 in the fourth condensate direction 228 may be assisted by the force of gravity. Thus, the condensate may be guided along the second portion 180 of the surface enhancement 176 to the first portion 178 of the surface enhancement 176. In some embodiments, the air flow, such as air flowing in the third air flow direction 224, may promote or carry the condensate in a fifth condensate direction 230 along the first portion 178 and to the exterior edge 182 of another adjacent aperture 162, where the flow process of the condensate described above may begin again. That is, the condensate may be directed from the exterior edge 182 of the adjacent aperture 162 to another second portion 180 of another adjacent surface enhancement 176 via the air flow, and to another first portion 178 of the adjacent surface enhancement 176 via the force of gravity, and so forth, until the condensate reaches a third fin end 232 of the first fin 152. At the third fin end 232, the condensate may be removed from the heat exchanger 148, such as by traveling along the third fin end 232 toward a drainage system.

On the second surface 170, condensate formed on the exterior edge 182 of one of the apertures 162 or on the conduit extending through one of the apertures 162 may be induced or carried by the air flow, such as air flowing in the fourth air flow direction 226. Specifically, the air flow moving in the fourth air flow direction 226 may force condensate to move from the exterior edge 182 toward the first surface enhancement end 186 of the first portion 178 of an adjacent surface enhancement 176 in a sixth condensate direction 234. The air flow may then further promote and/or carry the condensate along the first portion 178 to the second portion 180 of the surface enhancement 176. The condensate on the second portion 180 may then be directed in a seventh condensate direction 236, which may be assisted by the force of gravity, along the second portion 180 and to the exterior edge 182 of another aperture 162. The flow process of the condensate may then be repeated across additional apertures 162 and surface enhancements 176 until the condensate is directed off a side 238 of the second fin 154 or a fourth fin end 248 of the second fin 154.

As shown in FIG. 6, the first portion 178 and the second portion 180 of the surface enhancements 176 may each be aligned crosswise with the respective longitudinal axis 155 of each heat exchanger slab 149, 150. For example, the first portion 178 may be at a first portion angle 243 with respect to the respective longitudinal axis 155 of each heat exchanger slab 149, 150, such as between 5 degrees and 50 degrees. The second portion 180 may be at a second portion angle 244 with respect to the respective longitudinal axis 155 of each heat exchanger slab 149, 150, such as between 5 degrees and 50 degrees, which may be different or substantially the same as the first portion angle 243. To this end, the surface enhancement angle 181 may be between 80 degrees and 170 degrees. In this manner, the first portion 178 and the second portion 180 of the surface enhancements 176 may each also be crosswise with a lateral axis 245 extending along a respective width 246 of the first and second heat exchanger slabs 149, 150. In some embodiments, the first portion angle 243, the second portion angle 244, and/or the surface enhancement angle 181 may vary between surface enhancements 176 of different heat exchanger slabs 149, 150, of different fins 152, 154 of the same heat exchange slab 149, 150, or within the same fin 152, 154.

In the horizontal orientation of the heat exchanger 148 shown in FIG. 6, a vector of the first portion 178 of one or more surface enhancements 176 may be generally aligned with the direction of air flow. In some embodiments, the first portion 178 may extend along the direction of air flow. A vector of the second portion 180 one or more surface enhancements 176 may be generally aligned with the vector of gravity 158. In other words, the second portion 180 may be angled at least partially toward the vector of gravity 158, or the second portion 180 may be aligned with the vector of gravity 158. As such, in the horizontal orientation of the heat exchanger 148, a combination of the force of gravity 158 and the air flow passing across the heat exchanger 148 may promote movement of the condensate along and off the first and second fins 152, 154 via the surface enhancements 176 and apertures 162. It should also be understood that such orientations of the first portion 178 and/or the second portion 180 may also be applied to the heat exchanger 148 in the vertical orientation of FIG. 5. Thus, in the vertical orientation of the heat exchanger 148 shown in FIG. 5, a vector of both the first portion 178 and the second portion 180 of each surface enhancement 176 may be generally aligned with the vector of gravity 158. In some embodiments, the first portion 178 or the second portion 180 may extend along the vector of gravity 158. As such, in the vertical orientation of the heat exchanger 148, the force of gravity may promote movement of the condensate along and off the first and second fins 152, 154 via the surface enhancements 176 and apertures 162.

Although FIGS. 5 and 6 illustrate the first and second fins 152, 154 with respective surface enhancements 176 as mirrored orientations of one another about the central axis 163, in additional or alternative embodiments, the surface enhancements 176 may be oriented at different angles, positions, and/or configurations than those depicted. For example, the second fin 154 may be a rotated orientation of the first fin 152 rather than a mirrored orientation. Thus, the force of gravity and/or the air flow may direct the condensate across the respective fins 152, 154 in different manners than discussed in this disclosure.

In some embodiments, surface enhancements 176 may be oriented differently based on the direction of air flow across the first and second fins 152, 154. For example, the first and second fins 152, 154 of the illustrated embodiment of FIG. 6 may be configured for when the air flow is directed in the third air flow direction 224. That is, the surface enhancement angle 181 is generally facing away from the third air flow direction 224. However, when the air flow is directed in the fourth air flow direction 226, the surface enhancements 176 may be oriented differently. For example, when the air flow is directed in the fourth air flow direction 226, the surface enhancements 176 may be mirrored about the vector of gravity 158 relative to the orientation of the surface enhancements 176 for when the air flow is directed in the third air flow direction 224. That is, the surface enhancement angle 181 may be generally facing away from the fourth air flow direction 226. In general, the surface enhancements 176 may be oriented in any suitable manner, in which the first portion 178 and the second portion 180 are each crosswise to the longitudinal axis 155 and the lateral axis 245 promote movement of the condensate off the fins 152, 154.

Moreover, FIGS. 5 and 6 depict a particular number of surface enhancements 176 formed onto the first and second surfaces 168, 170, in which all surface enhancements 176 are aligned approximately similarly to one another. However, it should be understood that any number of surface enhancements 176 may be formed, and the surface enhancements 176 of the same fin may be oriented differently than one another. For example, a certain number of surface enhancements 176 of the first fin 152 may be oriented as the surface enhancements 176 of the first fin 152 depicted in FIG. 6, while another number of surface enhancements 176 of the first fin 152 may be oriented as the surface enhancements 176 of the second fin 154 depicted in FIG. 6.

It should also be appreciated that, although FIGS. 5 and 6 depict the heat exchanger 148 as including first and second fins 152, 154 of two respective heat exchanger slabs, in certain embodiments, the heat exchanger 148 may include additional heat exchanger slabs, each with fins having respective surface enhancements 176. For example, the heat exchanger 148 may include an additional heat exchanger slab positioned to mirror the position of the second fin 154 to form an N-shape configuration. However, it should be understood that each fin of the heat exchanger 148 may be positioned differently than one another, rather than in the mirrored positions described in FIGS. 5 and 6.

Figure 7:
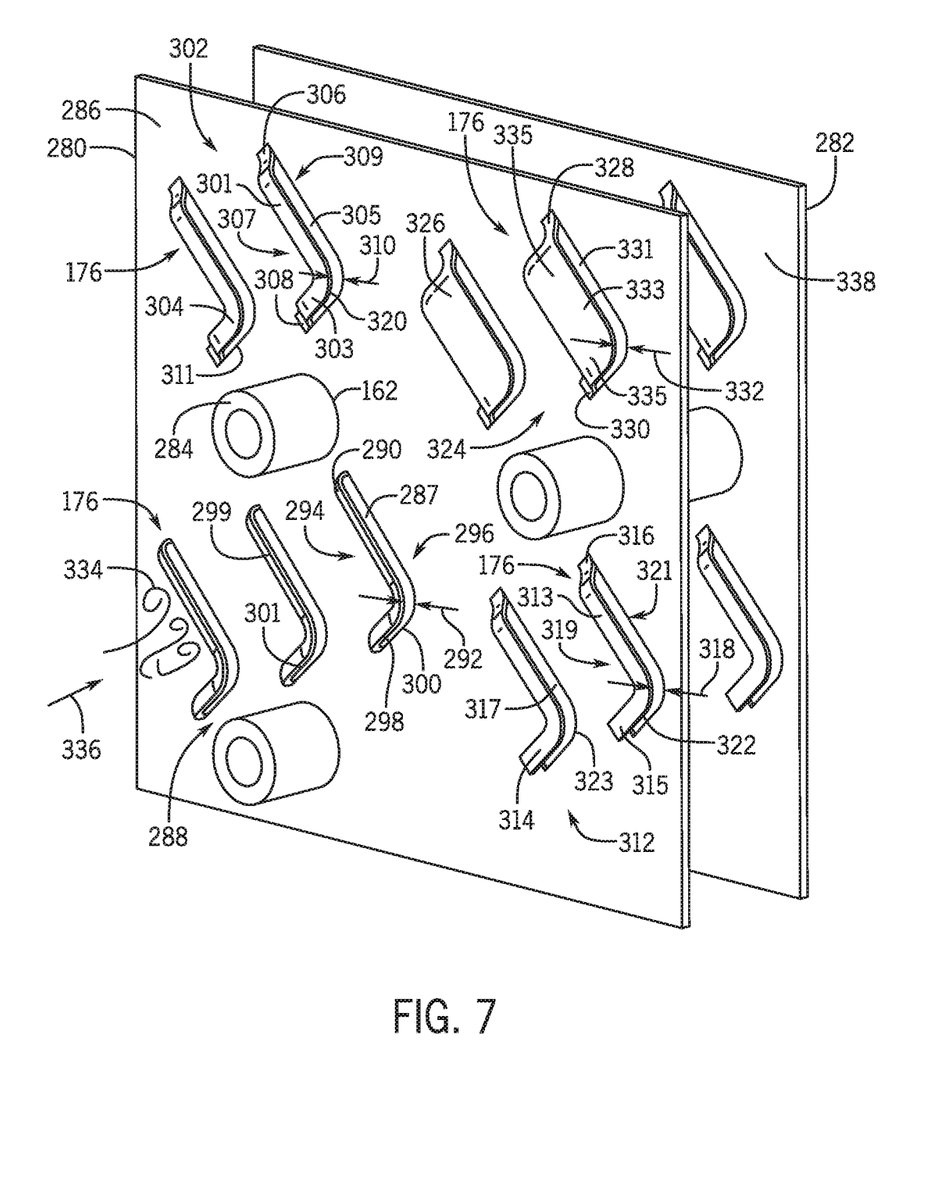
FIG. 7 is a cross-sectional perspective view of an embodiment of heat exchanger fins having different surface enhancements, in accordance with an aspect of the present disclosure.

FIG. 7 is a cross-sectional perspective view of an embodiment of a first fin portion 280 and a second fin portion 282 of one of the heat exchanger slabs 149, 150 of the heat exchanger 148. Several segments of conduits 284 may extend through apertures 162 of the first fin portion 280 and the second fin portion 282, and refrigerant may flow through each segment of conduits 284. In the illustrated embodiment, a first surface 286 of the first fin portion 280 includes several embodiments of surface enhancements 176 extending over and above, or overlapping, openings or slots of the first surface 286. In additional or alternative embodiments, the surface enhancements 176 may extend over and above, or overlap openings or slots on a surface opposite the first surface 286. A first type of surface enhancement 176 is shown by a plurality of louvers 288. In the illustrated embodiment, the three louvers 288 are positioned adjacent to one another, in which each of the louvers 288 includes a louver protrusion 290 extending above or outward from an opening or slot 287 in the first surface 286 by a first distance or height 292. That is, the louver protrusion 290 may be connected to the first surface 286 along a first side 294 of the louver protrusion 290, and the louver protrusion 290 may be disconnected from the first surface 286 along a second side 296 of the louver protrusion 290. For example, the louvers 288 may each be formed as a punch-through, in which a portion of the surface 286 is punched or indented to simultaneously form the slot 287 and the louver protrusion 290. The discontinuity of the louver protrusion 290 and the slot 287 may induce movement of condensate. For example, surface cohesion may cause condensate to cling to a louver edge 298 of each louver 288 and the force of gravity and/or the air flow may promote movement of the condensate along the louver edge 298. Similarly, surface cohesion may cause condensate to cling to a slot edge 300 of the slot 287 and the force of gravity and/or the air flow may promote movement of the condensate along the slot edge 300. As depicted in FIG. 7, the louver protrusion 290 may be shaped to form a first portion 299 and a second portion 301 of the louvers 288 along which the condensate may travel.

Another type of surface enhancement 176 may include a bridge lance 302. The illustrated embodiment shows two bridge lances 302 grouped together, in which each bridge lance 302 has substantially the same geometries. Each bridge lance 302 may include a bridge lance protrusion 304 that forms a first portion 301 and a second portion 303 of the bridge lance 302 above and above or outward from a slot 305 of the bridge lance 302. The bridge lance protrusion 304 may be connected to the first surface 286 at a first bridge lance end 306 adjacent to the first portion 301 and at a second bridge lance end 308 adjacent to the second portion 303. However, the bridge lance protrusion 304 may be disconnected from the first surface 286 along a remainder of the bridge lance protrusion 304, such as along a first side 307 and a second side 309 of the bridge lance protrusion 304. The connection at the first bridge lance end 306 and the second bridge lance end 308 may elevate the bridge lance protrusion 304 from the slot 305 by a second distance or height 310, which may be substantially the same or different than the first distance 292. On the bridge lance protrusion 304, condensate may travel along a bridge lance edge 320 on the first side 307 and/or the second side 309 of the bridge lance protrusion 304, and/or along a slot edge 311 of the slot 305.

A similar type of surface enhancement 176 includes an angled lance 312. FIG. 7 depicts two angled lances 312 grouped adjacent to one another, in which each angled lance 312 has a similar geometry. Each angled lance 312 may include an angled lance protrusion 314 that is shaped similarly as the bridge lance protrusion 304. However, the angled lance protrusion 314 may be connected to the first surface 286 at a single angled lance end 316, and the angled lance protrusion 314 may be disconnected from the first surface 286 along a remainder of the angled lance protrusion 314. In FIG. 7, the angled lance end 316 is adjacent to the first portion 313 of the angled lance protrusion 314, but it should be understood that, in certain embodiments, the angled lance end 316 may be adjacent to the second portion 315 of the angled lance protrusion 314. Additionally, the connection at the angled lance end 316 may elevate the angled lance protrusion 314 a third distance or height 318 from a slot 317 of the angled lance 312. On the angled lance protrusion 314, condensate may travel along an angled lance edge 322 on a first side 319 and/or a second side 321 of the angled lance protrusion 314, and/or along a slot edge 323 of the slot 317.

The surface 286 also includes a group of two double sided lances 324, in which each double sided lance 324 includes a double sided lance protrusion 326. Each double sided lance protrusion 326 may be similar to the bridge lance protrusion 304, in that the double sided lance protrusion 326 may be connected to the first surface 286 at a first double sided lance end 328 and at a second double sided lance end 330 to elevate the double sided lance protrusion 326 by a fourth distance 332 from a slot 331 of the double sided lances 324. However, as shown in FIG. 7, the double sided lance protrusion 326 includes a substantially quadrilateral shape that has two first portions 333 positioned opposite one another and two second portions 335 positioned opposite one another, in which both first portions 333 and both second portions 335 are disconnected from the first surface 286. As a result, condensate may travel along either first portions 333, either second portions 335, and/or along the slot edge 300. The double sided lance 324 may enable surface enhancements 176 to cover a larger surface area of the first surface 286. In other words, the discontinuities of an individual double sided lance 324 cover a larger surface area than discontinuities of the louver 288, the bridge lance 302, and/or the angled lance 312. A greater surface area of discontinuities may induce greater movement of condensate across the first surface 286 by providing a greater number of surfaces, edges, or other paths along which condensate may travel. Accordingly, fewer surface enhancements 176 of the double sided lance 324 may be formed on the first surface 286 to induce a desirable movement of condensate across the first surface 286.

In certain embodiments, forming each surface enhancement 176 may include punching the first surface 286 to form the respective slots 287, 305, 317, 331, in which the punched portions of the first surface 286 also form the respective protrusions 290, 304, 314, 326. For example, the first surface 286 may be cut via plasma, a waterjet, a laser, a drill, another method, or any combination thereof, to form each slot 287, 305, 317, 331. The protrusions 290, 304, 314, 326 may then be formed by shaping the first surface 286 adjacent to the respective slots 287, 305, 317, 331 such as via a press and/or a punch, into the desired shape of the protrusion 290, 304, 314, 326. Thus, the louvers 288, bridge lances 302, angled lances 312, and double sided lances 324 may each be considered a punch-through.

In additional or alternative embodiments, each surface enhancement 176 may be a separate component from the respective fin. That is, each surface enhancement 176 may be formed separately from the first fin portion 280 and may be coupled to the first surface 286, such as via welding, fastening, punching, fitting, another suitable method, or any combination thereof. In further embodiments, the first surface 286 may not include the slots 287, 305, 317, 331, but instead, each surface enhancement 176 may extend over a portion of the first surface 286.

In any case, the discontinuities of the surface enhancements 176 may induce movement of condensate across the first surface 286. Furthermore, the discontinuities of the surface enhancements 176 may also induce turbulent flow of air flow directed across the first surface 286. That is, the surface enhancements 176 may disrupt the air flow directed across the first surface 286. For example, an air flow 334 may be directed or forced in a direction 336 across the first surface 286. The air flow 334 may be disrupted by the surface enhancement 176 and may flow around the surface enhancement 176, which may create eddies and/or vortices of the air flow 334, including separation, reattachment, and/or recirculation of air flow, to produce turbulent air flow. In general, turbulent air flow may enhance heat exchange between the air flow 334 and refrigerant. For example, in turbulent air flow, different portions of the air flow 334 may be flowing in different directions. In this manner, multiple portions of the air flow 334 may contact the first surface 286 and heat may be more effectively distributed throughout the air flow 334. It should be understood that turbulent air flow may also be produced when the air flow 334 is directed in another direction across the first surface 286, such as a direction opposite the direction 336.

Although FIG. 7 depicts the first fin portion 280 as having several different types of surface enhancements 176 on the first surface 286, in other embodiments, the first fin portion 280 may have the same type of surface enhancement 176 disposed throughout the first surface 286. Moreover, FIG. 7 illustrates that the same types of surface enhancements 176 are formed adjacent to one another, but it should be understood that in additional or alternative embodiments, different types of surface enhancements 176 may be formed adjacent to one another. Furthermore, it should be understood that although FIG. 7 depicts a certain number of surface enhancements 176 disposed on the first surface 286 and at certain positions of the first surface 286, there may be any number of surface enhancements 176 positioned in any suitable manner on the first surface 286. Further still, it should be understood that other types of surface enhancements 176 not illustrated in FIG. 7 may be formed on the first surface 286, such as ribs and/or surface enhancements 176 of different shapes.

In certain embodiments, the second fin portion 282 may include surface enhancements 176 on a second surface 338. Additionally or alternatively, the first fin portion 280 may include surface enhancements 176 on a surface opposite the first surface 286. In any case, the surface enhancements 176 formed on other surfaces or fins may be substantially similar or may be substantially different than the surface enhancements 176 on the first surface 286. Indeed, certain surfaces may not include any surface enhancements 176.

The fins of the present disclosure may provide one or more technical effects useful in the operation of HVAC systems. For example, a heat exchanger may have heat exchanger slabs that each include the fins of the present disclosure to place an air flow in thermal communication with a refrigerant. The fins may include surface enhancements that induce movement of condensate formed on the fin across a surface to be removed from the fin. Moreover, the surface enhancements may also disrupt a flow of air flow across the fin to enhance heat exchange between the air flow and a refrigerant. Each surface enhancement may include a first portion and a second portion, in which both the first portion and the second portion are oriented crosswise to a longitudinal axis and/or a lateral axis of the heat exchanger slabs. In this manner, the surface enhancement may induce movement of condensate in different orientations of the fin, in which the fin may be positioned at an angle with respect to a vector of gravity in the different orientations. By removing condensate from the fin and enhancing heat transfer between the air flow and the refrigerant, operation of the heat exchanger may be improved. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heat exchanger, comprising:
a conduit configured to flow a refrigerant therethrough; and
a fin coupled to the conduit, wherein the fin has an opening formed therethrough, the opening having a first portion extending along the fin in a first direction and a second portion different from the first portion and extending along the fin in a second direction crosswise to the first direction, wherein the first portion and the second portion are continuous with one another, the first portion has a first length, the second portion has a second length, and the first length and the second length are different from one another.

2. The heat exchanger of claim 1, comprising:
a first heat exchanger slab having the conduit and the fin; and
a second heat exchanger slab, wherein the first heat exchanger slab and the second heat exchanger slab coordinate to form an A-shape configuration.

3. The heat exchanger of claim 2, wherein the first portion is oriented relative to the second portion at a first angle, the first portion is disposed at a second angle relative to a longitudinal axis of the first heat exchanger slab, and the second portion is disposed at a third angle relative to the longitudinal axis of the first heat exchanger slab.

4. The heat exchanger of claim 3, wherein the first angle is between 80 degrees and 170 degrees, the second angle is between 5 and 50 degrees, and the third angle is between 5 and 50 degrees.

5. The heat exchanger of claim 1, wherein the fin has a protrusion extending therefrom, wherein the protrusion overlaps with the opening.

6. The heat exchanger of claim 5, wherein the protrusion comprises a third portion overlapping the first portion of the opening and extending along the first direction and a fourth portion overlapping the second portion of the opening and extending along the second direction.

7. The heat exchanger of claim 1, wherein the first portion and the second portion are oriented at an angle that faces away from a direction of air flow directed across the fin.

8. A heat exchanger, comprising:
a first heat exchanger slab including a plurality of first fins, wherein each first fin of the plurality of first fins has a plurality of first protrusions forming a plurality of first openings through the first fin, each first protrusion of the plurality of first protrusions having a first portion and a second portion continuous with the first portion, wherein the first portion overlaps the corresponding first opening and extends in a first direction along the corresponding first fin, and the second portion overlaps the corresponding first opening and extends in a second direction along the corresponding first fin at a first angle relative to the first direction; and
a second heat exchanger slab including a plurality of second fins, wherein each second fin of the plurality of second fins has a plurality of second protrusions forming a plurality of second openings through the second fin, each second protrusion of the plurality of second protrusions having a third portion and a fourth portion continuous with the third portion, wherein the third portion overlaps the corresponding second opening and extends in a third direction along the corresponding second fin, and the fourth portion overlaps the corresponding second opening and extends in a fourth direction along the corresponding second fin at a second angle relative to the third direction.

9. The heat exchanger of claim 8, wherein each first protrusion of the plurality of first protrusions is oriented substantially the same as one another, and each second protrusion of the plurality of second protrusions is oriented substantially the same as one another.

10. The heat exchanger of claim 8, wherein the first heat exchanger slab is positioned at an acute angle with respect to the second heat exchanger slab to form an A-shape configuration.

11. The heat exchanger of claim 8, wherein the first portion and the second portion are each disposed crosswise to a first longitudinal axis of the first heat exchanger slab, and the third portion and the fourth portion are each disposed crosswise to a second longitudinal axis of the second heat exchanger slab.

12. The heat exchanger of claim 11, wherein the first portion and the second portion are each disposed crosswise to a first lateral axis of the first heat exchanger slab, and the third portion and the fourth portion are each disposed crosswise to a second lateral axis of the second heat exchanger slab.

13. The heat exchanger of claim 8, wherein the first angle and the second angle are each between 80 degrees and 170 degrees.

14. The heat exchanger of claim 13, wherein the plurality of first protrusions is oriented to substantially mirror the plurality of second protrusions about a central axis of the heat exchanger.

15. The heat exchanger of claim 8, wherein the plurality of first protrusions extends from a first surface on a first side of the first fin, and the plurality of second protrusions extends from a second surface on a second side of the second fin.

16. A heat exchanger, comprising:
a conduit configured to flow a working fluid therethrough;
a fin coupled to the conduit and including an array of punch-throughs;
each punch-through of the array of punch-throughs forming an opening extending through the fin and a protrusion extending from an edge of the opening;
a first portion of the opening of each punch-through of the array of punch-throughs having a first trajectory that is substantially in alignment with an airflow path through the heat exchanger;
a second portion of the opening of each punch-through of the array of punch-throughs being continuous with the first portion and having a second trajectory that is different than the first trajectory;
a third portion of the protrusion of each punch-through of the array of punch-throughs extending along the first trajectory of the first portion of the corresponding opening; and a fourth portion of the protrusion of each punch-through of the array of punch-throughs extending along the second trajectory of the second portion of the corresponding opening.

17. The heat exchanger of claim 16, comprising:
a first heat exchanger slab including the conduit and the fin; and
a second heat exchanger slab, wherein the first heat exchanger slab and the second heat exchanger slab coordinate to form an A-shape configuration, wherein the airflow path through the heat exchanger traverses the first and second heat exchanger slabs.

18. The heat exchanger of claim 17, wherein the first portion is disposed at a first angle relative to a longitudinal axis of the first heat exchanger slab, and the second portion is disposed at a second angle relative to the longitudinal axis of the first heat exchanger slab.

19. The heat exchanger of claim 16, wherein the first trajectory is substantially in alignment with gravity.

20. The heat exchanger of claim 16, wherein the first trajectory is at an angle relative to the second trajectory.

21. The heat exchanger of claim 16, wherein the fin includes additional punch-throughs.

22. The heat exchanger of claim 16, wherein the first portion has a first length, the second portion has a second length, and the first length and the second length are different from one another.

23. The heat exchanger of claim 16, wherein the conduit is one of a plurality of conduits coupled to the fin, and wherein a plurality of punch-throughs of the array of punch-throughs are arranged to guide condensate flow between a subset of intersections between the plurality of conduits and the fin.

24. The heat exchanger of claim 16, wherein the array of punch-throughs includes a louver, a lance, or both.

* * * * *